United States Patent
Tan (10) Patent No.: US 9,558,680 B2
(45) Date of Patent: Jan. 31, 2017

(54) PAYLOAD IN PICTURE ENCODING

(71) Applicant: Sizhe Tan, Berkeley, CA (US)

(72) Inventor: Sizhe Tan, Berkeley, CA (US)

(\*) Notice: Subject to any disclaimer, the term of this patent is extended or adjusted under 35 U.S.C. 154(b) by 192 days.

(21) Appl. No.: 14/544,679

(22) Filed: Feb. 2, 2015

(65) Prior Publication Data

US 2015/0288515 A1 Oct. 8, 2015

Related U.S. Application Data (60) Provisional application No. 61/995,187, filed on Apr. 4, 2014.

(51) Int. Cl.
*H04L 9/08* (2006.01)
*G09C 5/00* (2006.01)
*H04N 1/32* (2006.01)
*G06F 3/12* (2006.01)

(52) U.S. Cl.
CPC ............ *G09C 5/00* (2013.01); *H04N 1/32144* (2013.01); *H04N 1/32272* (2013.01); *G06F 3/1243* (2013.01); *H04L 9/08* (2013.01)

(58) Field of Classification Search
CPC ..... G06F 3/1243; G09C 5/00; H04N 1/32144; H04N 1/32272; H04L 9/08
See application file for complete search history.

(56) References Cited

U.S. PATENT DOCUMENTS

| | | | | |
|---|---|---|---|---|
| 6,643,386 | B1* | 11/2003 | Foster | G06T 1/0028 382/100 |
| 8,442,221 | B2 | 5/2013 | Ming | |
| 8,611,649 | B2* | 12/2013 | Jia | G06F 17/3025 382/103 |
| 2005/0196013 | A1* | 9/2005 | Rhoads | G06F 17/30876 382/100 |

(Continued)

OTHER PUBLICATIONS

H.S. Manjunatha Reddy et al. "LWT Based Encrypted Payload Steganography" Proceedings of the Fourth International Conference on Advances in Recent Technologies in Communication and Computing, Oct. 2012. (pp. 169-172).*

(Continued)

*Primary Examiner* — Thomas Gyorfi
(74) *Attorney, Agent, or Firm* — Suganda Jutamulia (57) ABSTRACT

Processes include a process for transmitting a payload embedded in a picture using payload-in-picture-encoding. The process may comprises transmitting a human recognizable picture by a first device, receiving the transmitted human recognizable picture by a second device, the received human recognizable picture is processed and transformed into a payload, wherein the payload is one of a 2D payload image, an encrypted 2D payload image, a text message, an encrypted text message, a file, and encrypted file. The process is performed by taking remainders of an modulo operation with a modulus M of brightness values of pixels of the received recognizable picture, combining the taken remainders having n' bits of a plurality of pixels of the (Continued)

received human recognizable picture into a payload having n bits, wherein n is larger than n', and wherein a maximum of n' bit number is less than the modulus M, reconstructing the transformed payload comprising the payload having n bits combined from the taken remainders having n' bits.

19 Claims, 11 Drawing Sheets

(56) References Cited

U.S. PATENT DOCUMENTS

| | | | |
|---|---|---|---|
| 2006/0101269 A1* | 5/2006 | Moskowitz | G06F 21/10 713/176 |
| 2013/0179690 A1 | 7/2013 | Wu | |
| 2013/0262314 A1 | 10/2013 | Butler et al. | |
| 2013/0283061 A1 | 10/2013 | Jeong | |

OTHER PUBLICATIONS

Mohammad Farahani et al. "A DWT Based Perfect Secure and High Capacity Image Steganography Method" 2013 International Conference on Parallel and Distributed Computing, Applications, and Technologies (pp. 314-317).*

Paul Watters et al. "Visual Detection of LSB-Encoded Natural Image Steganography" ACM Transactions on Applied Perception, vol. 5, No. 1, Article 5, Publication date Jan. 2008 (12 pages).*

Ian Davidson et al. "Locating Secret Messages in Images" KDD '04: Proceedings of the Tenth ACM SigKDD International Conference on Knowledge Discovery and Data Mining, Aug. 2004 (pp. 545-550).*

* cited by examiner

PAYLOAD IN PICTURE ENCODING

CROSS-REFERENCE TO RELATED APPLICATIONS

This application claims the benefit to U.S. Provisional Application No. 61/995,187, filed Apr. 4, 2014.

FIELD OF THE INVENTION

This invention relates to transmitting or storing an undetectable payload in a disguised carrying image and more specifically payload in picture encoding.

BACKGROUND OF THE INVENTION

Encryption processes such as AES encryption and RSA encryption and the like are widely known and commonly used for protecting a secret in transmission. A secret may be for privacy and the like. Since the message transmitted is encrypted, an unauthorized receiver may not be able to read it. However, although a receiver may not be able to decrypt the message received, the receiver knows that the message is encrypted, since the encrypted message is typically randomized and not human recognizable.

In some instances, an encrypted message may attract unwanted attention and more likely to get blocked or dropped in the transmission. Accordingly, not only an encrypted message is desired, but an encrypted message carried by a disguised media such as a human recognizable picture is also desired. So, the message transmitted looks like an unrelated but human recognizable picture, but actually a secret payload is encoded or embedded in the human recognizable image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, method or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, methods or characteristics may be combined in any suitable combinations and/or sub-combinations in one or more embodiments.

Figure 1:
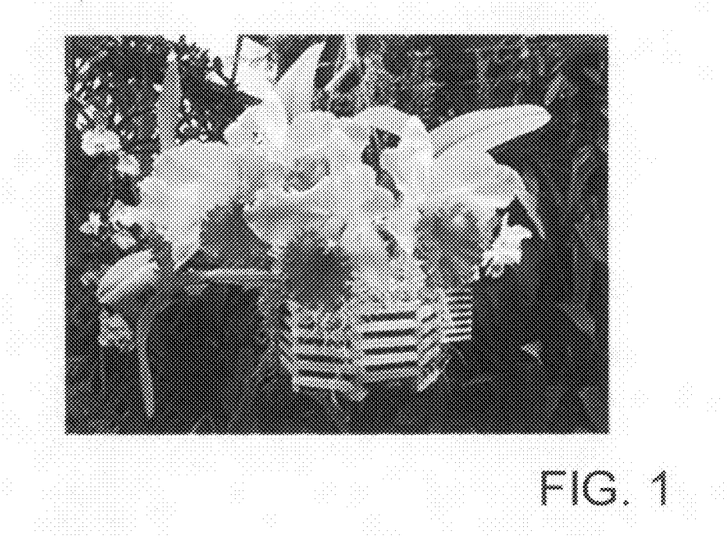
FIG. 1 shows an exemplary human recognizable picture to encode a payload.

FIG. 1 shows an exemplary human recognizable picture 100, for example an image "Flower" that will be encoded to carry a payload, in accordance with an embodiment of the present invention. A payload refers to the actual intended message in a transmission. 2D carrying image "Flower" 100 comprises M×N pixels or elements. M and N are integers. If carrying image "Flower" 100 is a monochrome image, each element has a brightness value. If carrying image "Flower" 100 is a color image, each element may have three values of R for red brightness, G for green brightness, and B for blue brightness.

Assuming carrying image "Flower" is a monochrome image, and each element has a brightness value from 0 to 255 gray levels. The brightness value is represented by 8 bit binary number. It is appreciated that the present invention is not limited to 8 bit binary number representation, any bit binary representation may be used. Similarly, it is not limited to monochrome carrying image, a color carrying image may be used as well.

If carrying image "Flower" 100 is a color image, each color value, R, G, and B, may be processed the same way as the brightness value is processed. Alternatively, one or two of R, G, and B values may be processed the same way as the brightness value is processed.

Figure 2:
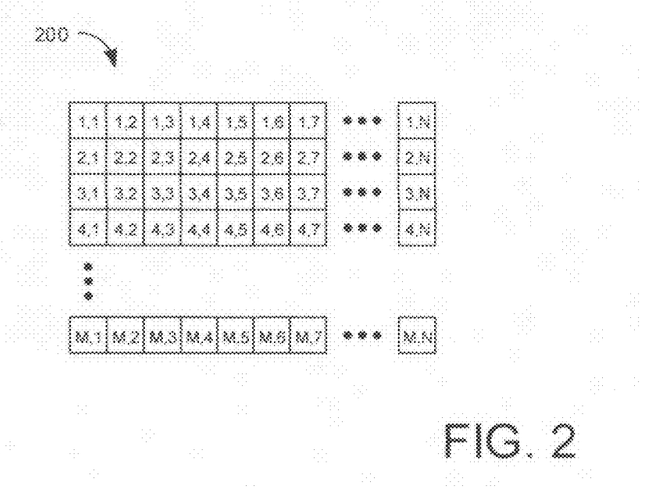
FIG. 2 shows schematically an exemplary picture represented by a 2D M×N array.
Figure 3:
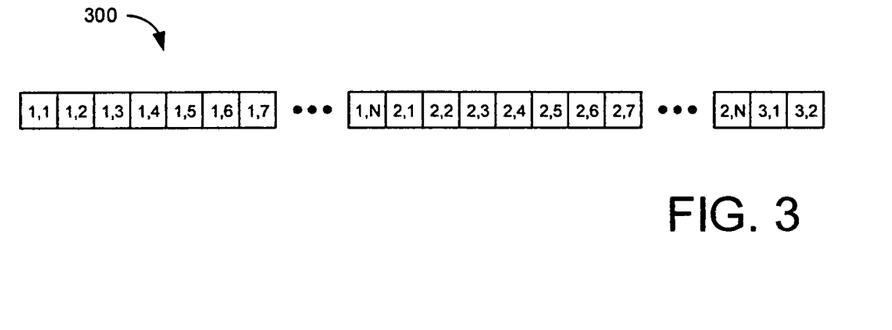
FIG. 3 shows schematically a carrying image 1D serialized array after serialization of 2D carrying image having M×N array.

FIG. 2 shows schematically 2D carrying image "Flower" 100 represented by a M×N array 200, in accordance with an embodiment of the present invention. FIG. 3 shows schematically a carrying image 1D serialized array 300 after serialization of 2D carrying image "Flower" 100 having M×N array 200, in accordance with an embodiment of the present invention. Serialization is the process of translating data structures into a 1D array that can be stored or transmitted across a network connection link and reconstructed later in the same computer environment. When the resulting series of data is reread according to the serialization format, it can be used to create the original object.

Figure 4:
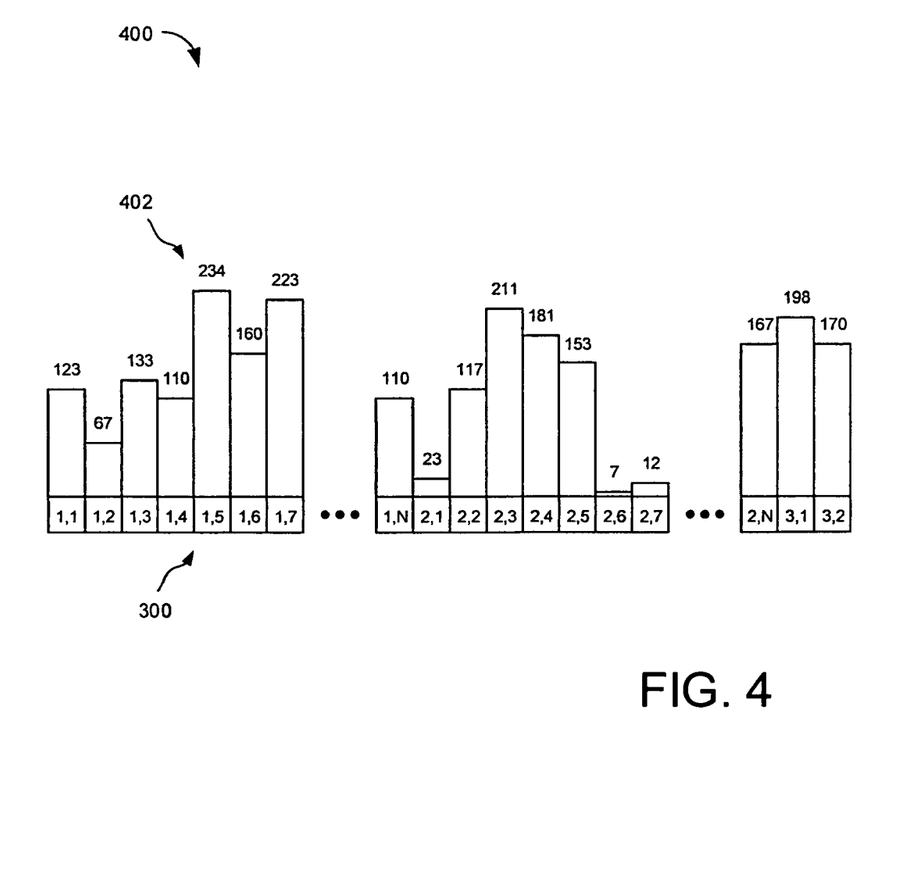
FIG. 4 shows an exemplary carrying image 1D serialized array having brightness values.

FIG. 4 shows an exemplary carrying image 1D serialized array of 8 bit binary numbers 400, in accordance with an embodiment of the present invention. The lower part of FIG. 4 shows carrying image 1D serialized array 300 corresponding to 2D M×N array 200. The upper part shows the exemplary brightness values 402 of elements of 2D M×N array 200.

The operation of finding the remainder is referred to as the modulo operation, and denoted with "mod" or "%" used as an operator. For example, the remainder of the division of 14 by 12 is denoted by 14 mod 12 or 14%12; as this remainder is 2, we have 14 mod 12=2 or 14%12=2. Note that we also have 26 mod 12=2 or 26%12=2. In the two examples described, the divisor 12 is referred to as the modulus. It may be written $$\text{Remainder} = \text{Number} \% \text{Modulus}. \tag{1}$$

The remainder of each brightness value is determined using the modulo operation. Any modulus may be used. For example, modulus 16 is used. The remainders of brightness values shown in FIG. 4 are given in Table 1 for modulus 16. Note that any modulus can be used as well.

The base of each brightness value is the brightness value subtracted with its remainder. It may be written $$\text{Base} = \text{Number} - \text{Remainder}, \tag{2}$$

where Remainder is given in Equation (1), and Number is the brightness value. The sum of the base and the remainder is the brightness value. The bases of brightness values shown in FIG. 4 are also given in Table 1 for modulus 16. Note that any modulus can be used as well.

TABLE 1

Remainders and bases of brightness values for modulus 16.

| Element | Brightness | Remainder | Base = Brightness-Remainder |
|---|---|---|---|
| 1,1 | 123 | 123% 16 = 11 | 112 |
| 1,2 | 67 | 67% 16 = 3 | 64 |
| 1,3 | 133 | 133% 16 = 5 | 128 |
| 1,4 | 110 | 110% 16 = 14 | 96 |
| 1,5 | 234 | 234% 16 = 10 | 224 |
| 1,6 | 160 | 160% 16 = 0 | 160 |
| 1,7 | 223 | 223% 16 = 15 | 208 |
| ... | | | |
| 1,N | 110 | 110% 16 = 14 | 96 |
| 2,1 | 23 | 23% 16 = 7 | 16 |
| 2,2 | 117 | 117% 16 = 5 | 112 |
| 2,3 | 211 | 211% 16 = 3 | 208 |
| 2,4 | 181 | 181% 16 = 5 | 176 |
| 2,5 | 153 | 153% 16 = 9 | 144 |
| 2,6 | 7 | 7% 16 = 7 | 0 |
| 2,7 | 12 | 12% 16 = 12 | 0 |

TABLE 1-continued

Remainders and bases of brightness values for modulus 16.

| Element | Brightness | Remainder | Base = Brightness-Remainder |
|---|---|---|---|
| ... | | | |
| 2,N | 167 | 167% 16 = 7 | 160 |
| 3,1 | 198 | 198% 16 = 6 | 192 |
| 3,2 | 170 | 170% 16 = 10 | 160 |

Figure 5:
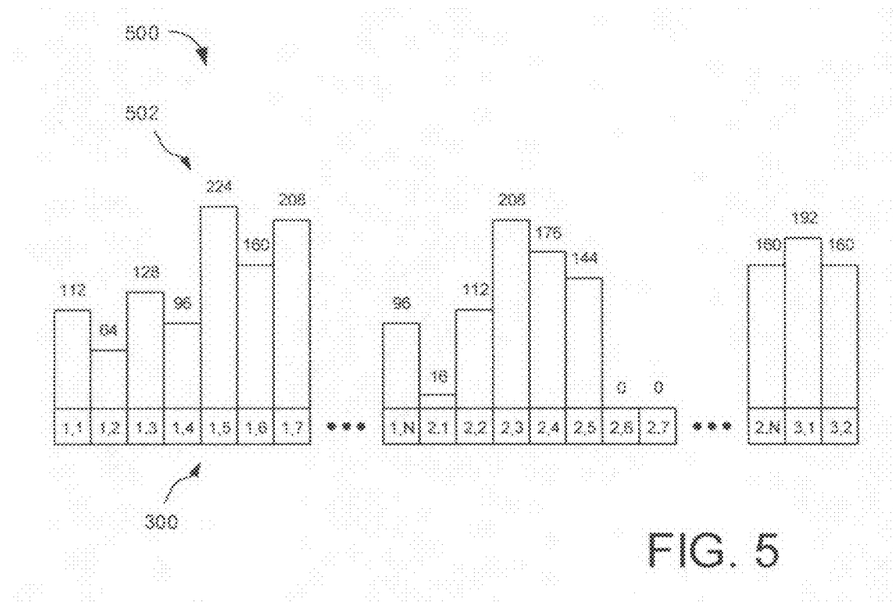
FIG. 5 shows an exemplary carrying image 1D serialized array having brightness values after remainders are removed.

FIG. 5 shows a carrying image 1D serialized array 500 having bases of the brightness values given in Table 1, in accordance with an embodiment of the present invention. The lower part of FIG. 5 shows carrying image 1D serialized array 300 corresponding to 2D M×N array 200. The upper part shows the bases of the brightness values 502 of elements of 2D M×N array 200.

Figure 6:
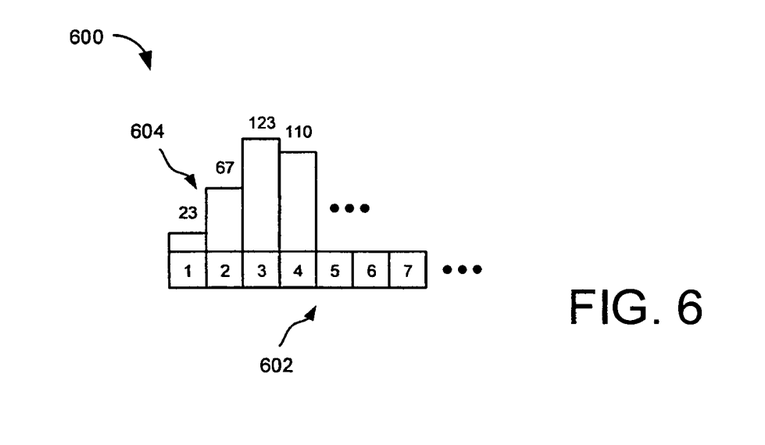
FIG. 6 shows an exemplary payload 1D serialized array.

FIG. 6 shows an exemplary payload 600, which has been serialized into a 1D array, in accordance with an embodiment of the present invention. The lower part of FIG. 6 shows elements of a payload 1D serialized array 602. The upper part shows payload 604 of each element of payload 1D serialized array 602. Each element of payload 1D serialized array 602 has a payload, for example, which is a number from 0 to 255 represented by 8 bit binary number. Payload 600 may be from an image, an encrypted image, a text message, an encrypted text message, a file, an encrypted file, or any data.

Each element of payload 1D serialized array 602 has a payload from 0 to 255, which is represented by 8 bit binary number. For example, element 1 of payload 1D serialized array 602 has a payload 23, element 2 has a payload 67, element 3 has a payload 123, element 4 has a payload 110, and so forth.

Number 23 is represented by 8 bit binary number as shown in Equation (3).

$$23 = \{0,0,0,1,0,1,1,1\}. \tag{3}$$

Number 67 is represented by 8 bit binary number as shown in Equation (4).

$$67 = \{0,1,0,0,0,0,1,1\}. \tag{4}$$

Number 123 is represented by 8 bit binary number as shown in Equation (5).

$$123 = \{0,1,1,1,1,0,1,1\}. \tag{5}$$

Number 23 is represented by 8 bit binary number as shown in Equation (6).

$$110 = \{0,1,0,1,1,0,1,0\}. \tag{6}$$

Figure 7:
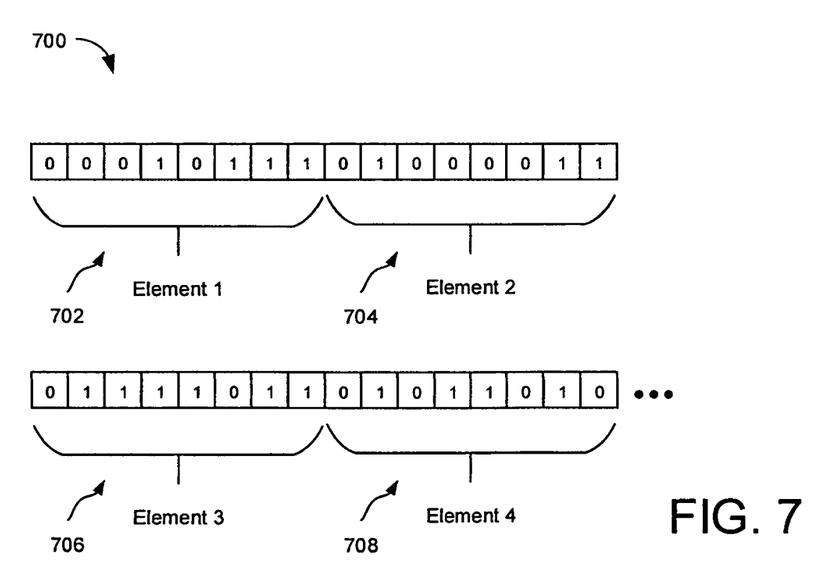
FIG. 7 shows a payload 1D serialized array comprising elements having payloads represented by 8 bit binary number.

FIG. 7 shows a payload 1D serialized array 700 comprising element 1 having payload 23 represented by a 8 bit binary number 702, element 2 having payload 67 represented by a 8 bit binary number 704, element 3 having payload 123 represented by a 8 bit binary number 706, element 4 having payload 110 represented by a 8 bit binary number 708, and so forth, in accordance with an embodiment of the present invention.

Figure 8:
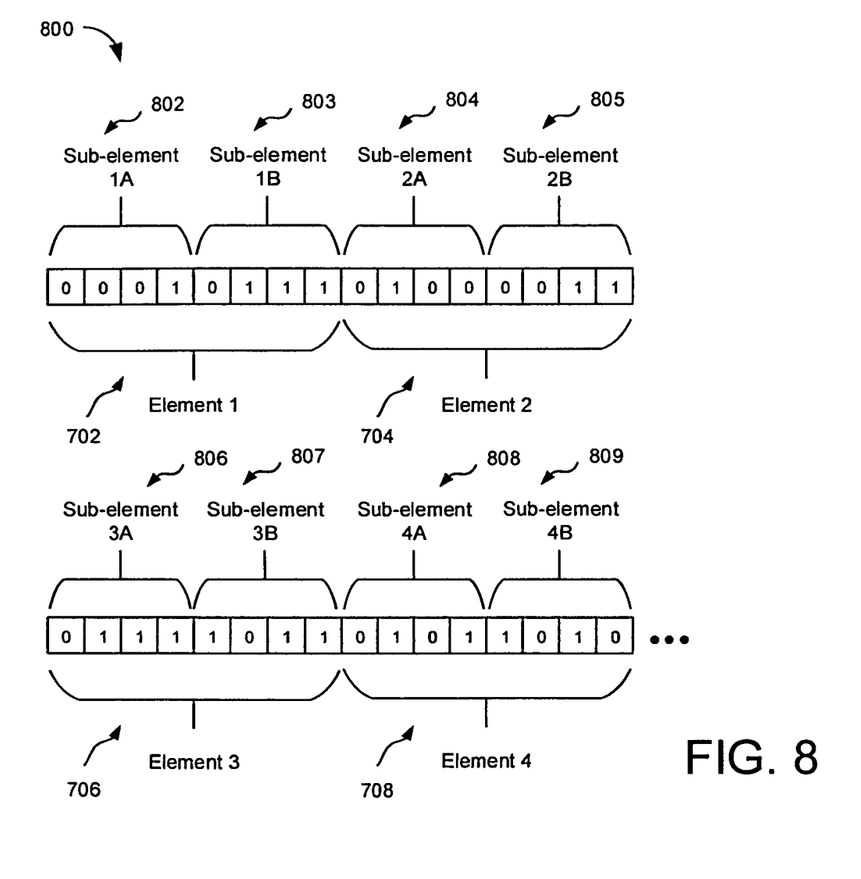
FIG. 8 shows a payload 1D serialized array comprising split sub-elements.

Element 1 may be split into two sub-elements, sub-element 1A and sub-element 1B, as shown in FIG. 8, in accordance with an embodiment of the present invention. Each sub-element 1A and sub-element 1B has a split payload represented by 4 bit binary number. Similarly, element 2 may be split into sub-elements 2A and 2B, element 3 may be split into sub-elements 3A and 3B, element 4 may be split into sub-elements 4A and 4B, and so forth.

The split payload of each split sub-element is given below.

$$\text{Sub-element 1A: } \{0,0,0,1\}=1. \tag{7}$$

$$\text{Sub-element 1B: } \{0,1,1,1\}=7. \tag{8}$$

$$\text{Sub-element 2A: } \{0,1,0,0\}=4. \tag{9}$$

$$\text{Sub-element 2B: } \{0,0,1,1\}=3. \tag{10}$$

$$\text{Sub-element 3A: } \{0,1,1,1\}=7. \tag{11}$$

$$\text{Sub-element 3B: } \{1,0,1,1\}=11. \tag{12}$$

$$\text{Sub-element 4A: } \{0,1,0,1\}=5. \tag{13}$$

$$\text{Sub-element 4B: } \{1,0,1,0\}=10. \tag{14}$$

It is important to notice that a 4 bit binary number represents numbers from 0 to 15, which is smaller than 16 that is the modulus used in this example. The payload represented by binary number is split into multiple pieces of split payloads, the number representing each piece of split payload is smaller than the modulus used. Thus, if the modulus is 16, payload is split into 4 bit binary numbers (0-15)<16. If the modulus is 8, payload is split into 3 bit binary numbers (0-7)<8. If the modulus is 4, payload is split into 2 bit binary numbers (0-3)<4. If the modulus is 2, payload is split into 1 bit binary numbers (0-1)<2. The maximum number of the split binary number is less than the modulus.

FIG. 8 shows a payload 1D serialized array 800 comprising split sub-elements 1A, 1B, 2A, 2B, 3A, 3B, 4A, 4B, and so forth, in accordance with an embodiment of the present invention. Sub-element 1A is represented by a 4 bit binary number 802, sub-element 1B is represented by a 4 bit binary number 803, sub-element 2A is represented by a 4 bit binary number 804, sub-element 2B is represented by a 4 bit binary number 805, sub-element 3A is represented by a 4 bit binary number 806, sub-element 3B is represented by a 4 bit binary number 807, sub-element 4A is represented by a 4 bit binary number 808, sub-element 4B is represented by a 4 bit binary number 809.

Figure 9:
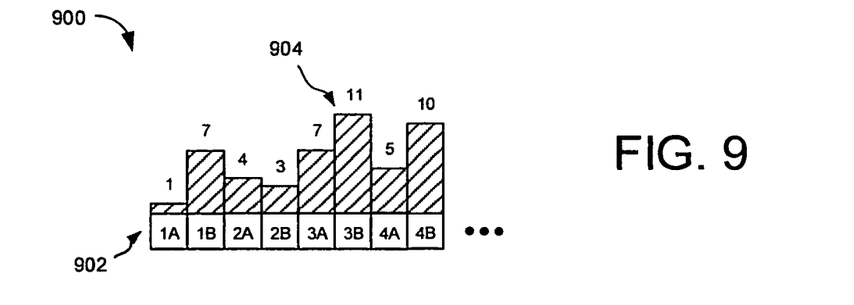
FIG. 9 shows a payload 1D serialized array comprising split sub-elements having per-pixel payloads.

The split payload is referred to as per-pixel payload. FIG. 9 shows payload 1D serialized array 900 having per-pixel payload comprising sub-elements 902, which are sub-elements 1A, 1B, 2A, 2B, 3A, 3B, 4A, 4B, and so forth, and their corresponding per-pixel payload 904 given in Equations (7)-(14), in accordance with an embodiment of the present invention. The per-pixel payload 904 of each sub-element 902 will be added to the base 502 of each element of carrying image 1D serialized array 300 of FIG. 5.

$$\text{Brightness=Base+Per-Pixel Payload.} \tag{15}$$

Thus, sub-element 1A is matched with element or pixel (1,1), sub-element 1B is matched with element or pixel (1,2), sub-element 2A is matched with element or pixel (1,3), and so forth.

Figure 10:
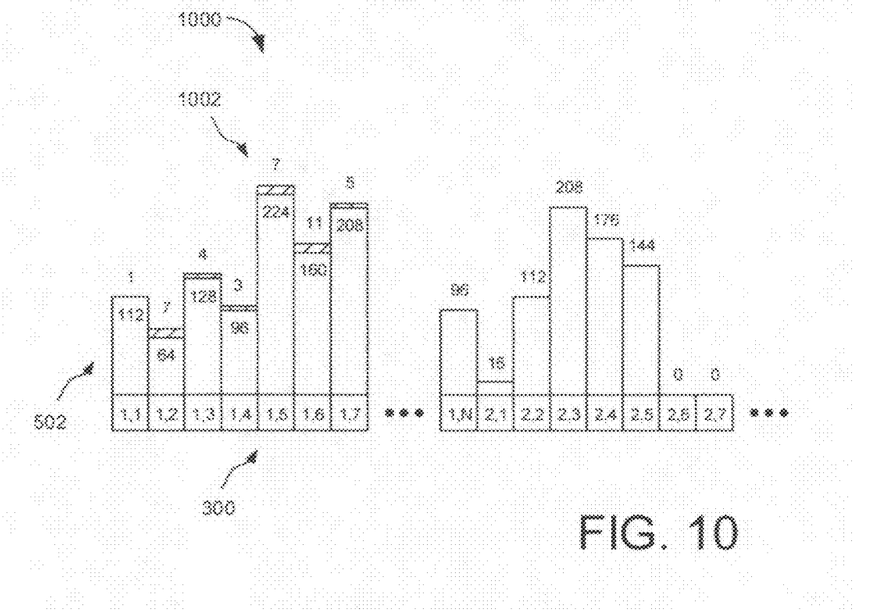
FIG. 10 shows a carrying image 1D serialized array having per-pixel payloads added to bases of original brightness values.

FIG. 10 shows a carrying image 1D serialized array 1000 having per-pixel payloads 1002 added to bases 502 of carrying image 1D serialized array 300, in accordance with an embodiment of the present invention. The brightness is the sum of the per-pixel payload and the base. As described previously, the 4 bit per-pixel payload 1002 is smaller than the modulus 16. The per-pixel payload 1002 is in general smaller than the base 502 of carrying image 1D serialized array 300. Accordingly, the brightness of carrying image 1D serialized array 1000 having added per-pixel payloads is almost the same as the brightness of carrying image 1D serialized array 400. Note, the brightness value may also be simply referred to as the brightness.

Carrying image 1D serialized array 1000, which carries per-pixel payload, may be transmitted to and received by a receiver. The received carrying image 1D serialized array 1000 may be deserialized to return to the original format of an image comprising 2D M×N pixels. In an embodiment, the carrying image 1D serialized array 1000, which carries per-pixel payload, may not be transmitted but stored in a memory device for later retrieval.

Serialization is the process of translating data structures into a 1D array that can be stored or transmitted across a network connection link and reconstructed later in the same computer environment. Deserialization is the reversed process. In deserialization, the serialized 1D array of data is read according to the serialization format to create the original object.

Figure 11:
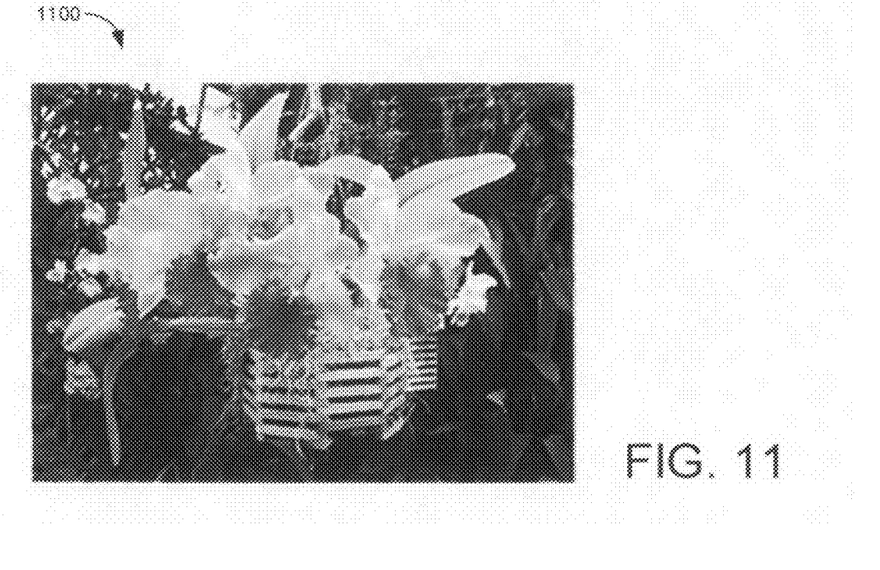
FIG. 11 shows an exemplary picture already embedded with a payload.

Carrying image 1D serialized array 1000 is deserialized to return to its original format as shown in FIG. 2. FIG. 11 shows an exemplary picture 1100, which is carrying image "Flower" of FIG. 1 already encoded with a payload, in accordance with an embodiment of the present invention. The difference between FIG. 1 and FIG. 11 may not be visible to the human eye.

Exemplary picture 1100, which is carrying image "Flower" of FIG. 1 already encoded with a payload, may be transmitted in a network or stored in a storage. To preserve the payload embedded in the carrying image, the carrying image may be transmitted or stored in a lossless format. For example, the lossless format includes PNG and GIF formats.

Figure 12:
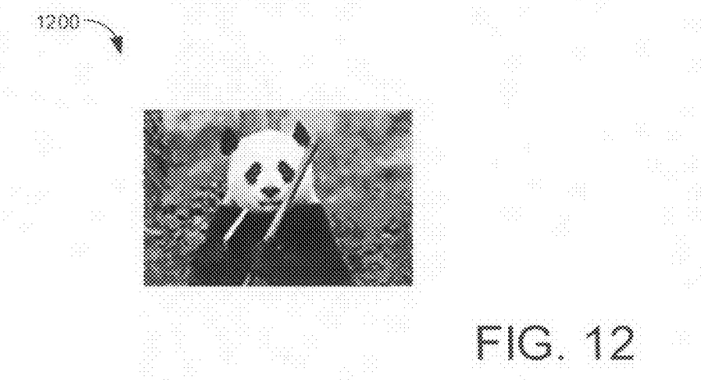
FIG. 12 shows an exemplary payload embedded in carrying image.

The payload encoded or embedded in picture 1100 is, for example, a payload image "Panda" 1200, which is shown in FIG. 12, in accordance with an embodiment of the present invention. Payload image "Panda" 1200 is serialized to form payload 1D serialized array 600 of FIG. 6.

To unpack the payload embedded in the picture, the remainder of the brightness of the received carrying image 1D serialized array 1000 of FIG. 10 is determined using the same modulo operation, i.e., the modulus is 16. The remainders and the brightness values of the elements of the carrying image are given in Table 2.

TABLE 2

Remainders and brightness values of carrying image.

| Element of carrying image | Sub-element of payload | Brightness | Remainder | 4 bit binary |
|---|---|---|---|---|
| 1,1 | 1A | 113 | 113% 16 = 1 | {0,0,0,1} |
| 1,2 | 1B | 71 | 71% 16 = 7 | {0,1,1,1} |
| 1,3 | 2A | 132 | 132% 16 = 4 | {0,1,0,0} |
| 1,4 | 2B | 99 | 99% 16 = 3 | {0,0,1,1} |
| 1,5 | 2C | 231 | 231% 16 = 7 | {0,1,1,1} |
| 1,6 | 2D | 171 | 171% 16 = 11 | {1,0,1,1} |
| 1,7 | 3A | 213 | 213% 16 = 5 | {0,1,0,1} |
| ... | | | | |

It is appearance that by taking the modulo operation of the brightness of each element of the carrying image 1D serialized array, the per-pixel payload can be retrieved.

$$\text{Per-Pixel Payload=Brightness \% Modulus.} \tag{16}$$

This is true because the per-pixel payload is smaller than the modulus, and the remainders of the original brightness values of the elements of carrying image have been removed. The example given in Table 2 shows that the per-pixel payloads of sub-elements 1A-3A of payload 1D serialized array are retrieved, which are identical to Equations (7)-(11), respectively.

By combining sub-elements 1A and 1B to be element 1, sub-elements 2A and 2B to be element 2, and so forth, the payload represented by 8 bit binary numbers can be reconstructed, which are the same as Equations (3)-(6). Thus the payloads of all elements of payload 1D serialized array 600 of FIG. 6 can be reconstructed. The reconstructed payload 1D serialized array 600 may be deserialized to return to its original format, for example, payload image "Panda" as shown in FIG. 12.

Figure 13:
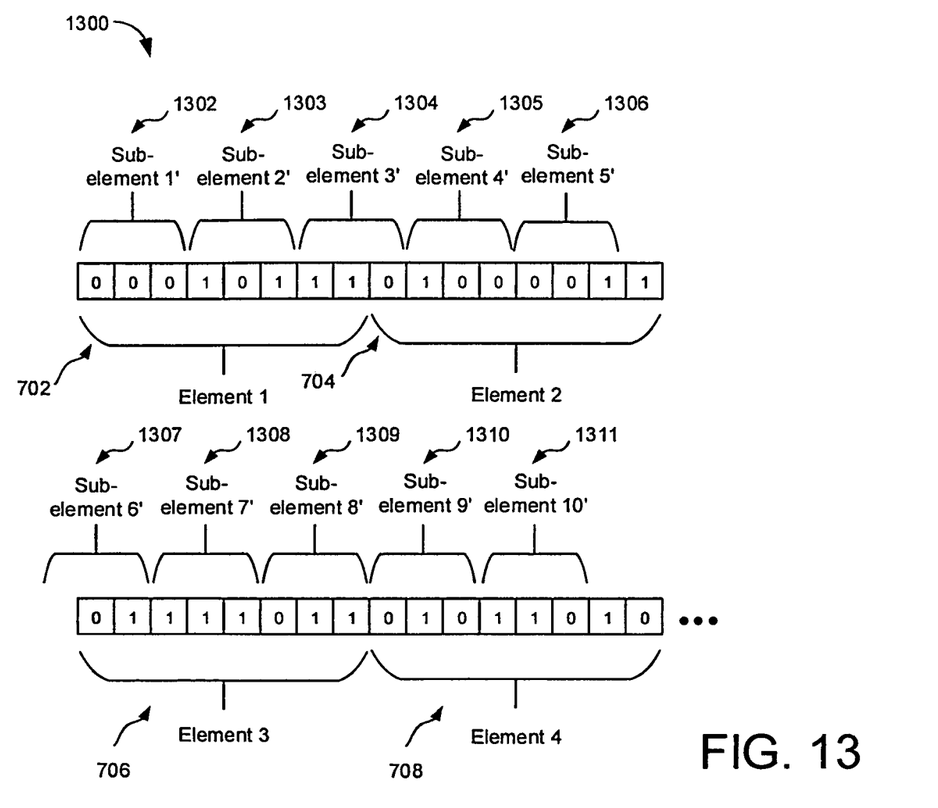
FIG. 13 shows a payload 1D serialized array comprising elements having 8 bit payloads.

In an embodiment, the modulus may be 8. Accordingly, the per-pixel payload is a 3 bit binary number. So the per-pixel payload is smaller than 8. Following the example given in FIG. 7, each element of payload 1D serialized array 700 comprises 8 bit binary number. FIG. 13 shows a payload 1D serialized array 1300 similar to payload 1D serialized array 700, in accordance with an embodiment of the present invention. Elements 1, 2, 3, 4, which are represented by 8 bit binary numbers 702, 704, 706, 708, respectively, are rearranged into sub-elements 1', 2', 3', 4', 5', and so forth. Sub-elements 1'-10' are represented by 3 bit binary numbers 1302-1311, respectively. The first three bits of element 1 become sub-element 1', the second three bits of element 1 become sub-element 2'. The last two bits of element 1 and the first bit of element 2 become sub-element 3', and so forth. In this manner, all elements of payload 1D serialized array 700 comprising 8 bit binary numbers are rearranged into sub-elements of payload 1D serialized array 1300 having per-pixel payload represented by 3 bit binary numbers.

Figure 14:
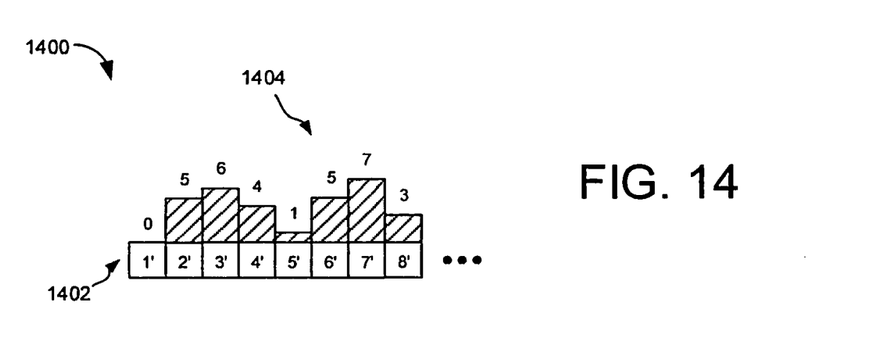
FIG. 14 shows a payload 1D serialized array comprising sub-elements having 3 bit per-pixel payloads.

FIG. 14 shows payload 1D serialized array 1400 having per-pixel payloads comprising sub-elements 1402, which are sub-elements 1', 2', 3', 4', and so forth, and their corresponding per-pixel payload 1404 given in Equations (17)-(26), in accordance with an embodiment of the present invention.

The per-pixel payload of each rearranged sub-element is given below.

$$\text{Sub-element 1': } \{0,0,0\}=0. \tag{17}$$

$$\text{Sub-element 2': } \{1,0,1\}=5. \tag{18}$$

$$\text{Sub-element 3': } \{1,1,0\}=6. \tag{19}$$

$$\text{Sub-element 4': } \{1,0,0\}=4. \tag{20}$$

$$\text{Sub-element 5': } \{0,0,1\}=1. \tag{21}$$

$$\text{Sub-element 6': } \{1,0,1\}=5. \tag{22}$$

$$\text{Sub-element 7': } \{1,1,1\}=7. \tag{23}$$

$$\text{Sub-element 8': } \{0,1,1\}=3. \tag{24}$$

$$\text{Sub-element 9': } \{0,1,0\}=2. \tag{25}$$

$$\text{Sub-element 10': } \{1,1,0\}=6. \tag{26}$$

To pack the payload, the per-pixel payload 1404 of each sub-element 1402 will be added to the base 502 of each element of carrying image 1D serialized array 300 of FIG. 5. Thus, sub-element 1' is matched with element or pixel (1,1), sub-element 2' is matched with element or pixel (1,2), sub-element 3' is matched with element or pixel (1,3), and so forth.

To unpack the payload, the modulo operation with the modulus 8 of the brightness of each element is performed. Since the per-pixel payload is smaller than the modulus, and the remainders of the original brightness values of the elements of carrying image have been removed, the per-pixel payload 1400 of FIG. 14 can be retrieved. By rearranging sub-elements 1', 2', 3', and so forth, to elements 1, 2, 3, and so forth, the payload 1D serialized array 700 of FIG. 7 represented by 8 bit binary numbers can be reconstructed. Accordingly, all payloads of payload 1D serialized array 600 of FIG. 6 can be reconstructed. The reconstructed payload 1D serialized array 600 may be deserialized to return to its original format, for example, payload image "Panda" as shown in FIG. 12.

Figure 15:
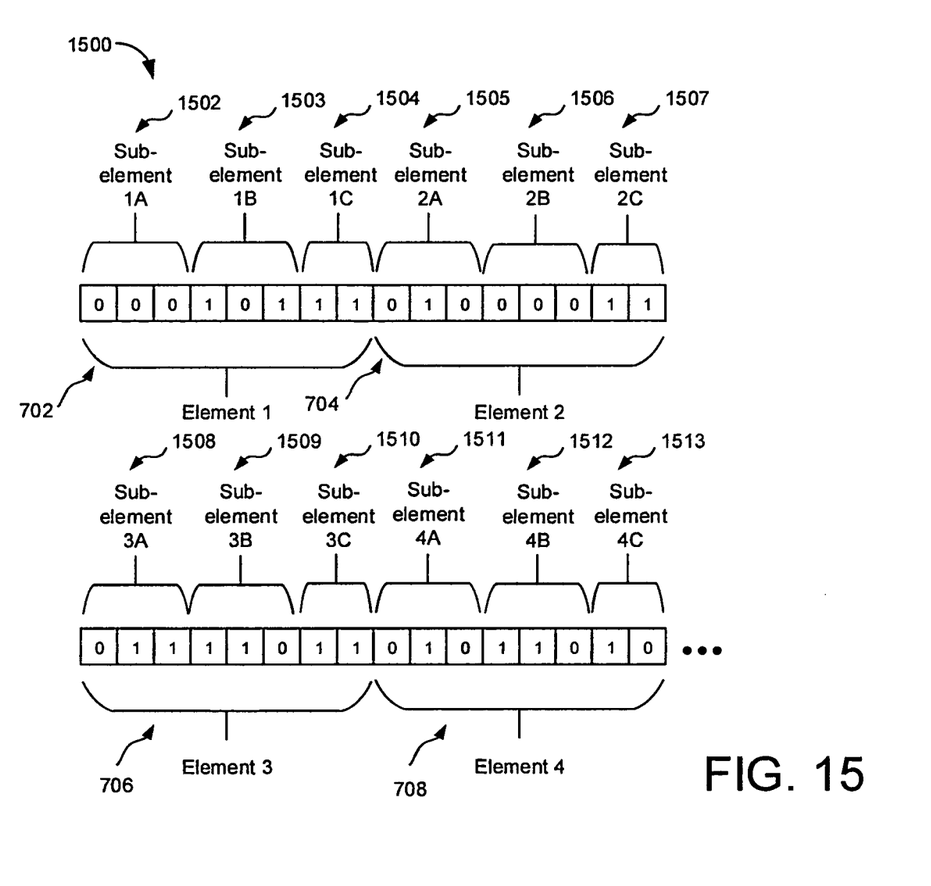
FIG. 15 shows a payload 1D serialized array comprising elements having 8 bit payloads.

FIG. 15 shows a payload 1D serialized array 1500 similar to payload 1D serialized array 700 for an embodiment of the same modulus 8, in accordance with an embodiment of the present invention. Following the example given in FIG. 7, each element of payload 1D serialized array 700 comprises 8 bit binary number.

Element 1 may be split into three sub-elements, sub-element 1A, sub-element 1B, and sub-element 1C. Sub-element 1A and sub-element 1B are represented by 3 bit binary numbers. However, sub-element 1C is represented by 2 bit binary number. In this way, the per-pixel payloads of sub-elements 1A, 1B, and 1C are respectively smaller than the modulus 8. Similarly, element 2 may be split into sub-elements 2A, 2B, and 2C, element 3 may be split into sub-elements 3A, 3B, and 3C, element 4 may be split into sub-elements 4A, 4B, and 4C, and so forth.

The per-pixel payload of each split sub-element is given below.

$$\text{Sub-element 1A: } \{0,0,0\}=0. \tag{27}$$

$$\text{Sub-element 1B: } \{1,0,1\}=5. \tag{28}$$

$$\text{Sub-element 1C: } \{1,1\}=3. \tag{29}$$

$$\text{Sub-element 2A: } \{0,1,0\}=2. \tag{30}$$

$$\text{Sub-element 2B: } \{0,0,0\}=0. \tag{31}$$

$$\text{Sub-element 2C: } \{1,1\}=3. \tag{32}$$

$$\text{Sub-element 3A: } \{0,1,1\}=3. \tag{33}$$

$$\text{Sub-element 3B: } \{1,1,0\}=6. \tag{34}$$

$$\text{Sub-element 3C: } \{1,1\}=3. \tag{35}$$

$$\text{Sub-element 4A: } \{0,1,0\}=2. \tag{36}$$

$$\text{Sub-element 4B: } \{1,1,0\}=6. \tag{37}$$

$$\text{Sub-element 4C: } \{1,0\}=2. \tag{38}$$

Sub-element 1A is represented by a 3 bit binary number 1502, sub-element 1B is represented by a 3 bit binary number 1503, sub-element 1C is represented by a 2 bit binary number 1504, sub-element 2A is represented by a 3 bit binary number 1505, sub-element 2B is represented by a 3 bit binary number 1506, sub-element 2C is represented by a 2 bit binary number 1507, sub-element 3A is represented by a 3 bit binary number 1508, sub-element 3B is represented by a 3 bit binary number 1509, sub-element 3C is represented by a 2 bit binary number 1510, sub-element 4A is represented by a 3 bit binary number 1511, sub-element 4B is represented by a 3 bit binary number 1512, sub-element 4C is represented by a 2 bit binary number 1513.

To pack the payload, the per-pixel payload of each sub-element 1A, 1B, 1C, 2A, 2B, and so forth, will be added to the base 502 of each element of carrying image 1D serialized array 300 of FIG. 5. Thus, sub-element 1A is matched with element or pixel (1,1), sub-element 1B is matched with element or pixel (1,2), sub-element 1C is matched with element or pixel (1,3), and so forth.

Figure 16:
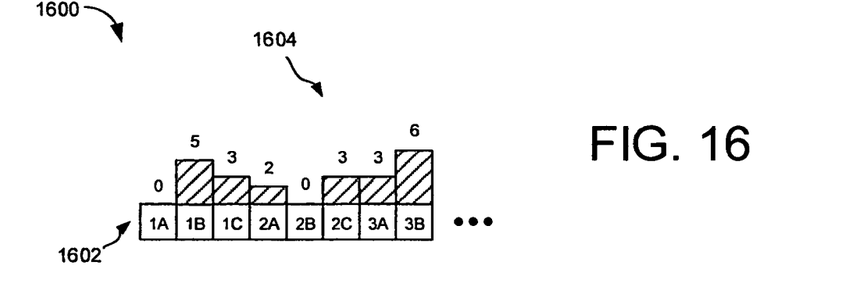
FIG. 16 shows a payload 1D serialized array comprising sub-elements having 3 bit, 3 bit, 2 bit per-pixel payloads.

To unpack the payload, the modulo operation of the brightness of each element of the carrying image 1D serialized is performed. Since the per-pixel payload is smaller than the modulus, and the remainders of the original brightness values of the elements of carrying image have been removed, the per-pixel payload 1604 of FIG. 16 can be retrieved, in accordance with an embodiment of the present invention. By combining sub-elements 1A having 3 bits, sub-element 1B having 3 bits, and sub-element 1C having only 2 bit to form element 1; combining sub-elements 2A having 3 bits, sub-element 2B having 3 bits, and sub-element 2C having only 2 bit to form element 2, and so forth, payload 1D serialized array 700 of FIG. 7 represented by 8 bit binary numbers can be reconstructed. Accordingly, all payloads of payload 1D serialized array 600 of FIG. 6 can be reconstructed. The reconstructed payload 1D serialized array 600 may be deserialized to return to its original format, for example, payload image "Panda" as shown in FIG. 12.

Referring back to FIG. 5, per-pixel payloads may be added to the base of selected elements or pixels of carrying image 1D serialized array 300 only. For example, referring back to FIG. 4, the selected elements of carrying image 1D serialized array 300 have brightness values between an upper bound (UB) and lower bound (LB). If the brightness value of an element is outside the range limited by UB and LB, the element skips the encoding (packing the payload) and decoding (unpacking the payload) process. A start position is the position of the selected pixel that one starts to pack the payload.

A payload, for example, the payload image "Panda" having PB (payload bit) bit brightness value per pixel, can be embedded in a picture, for example, the carrying image "Flower" having the same or different CB (carrying bit) bit brightness value per pixel. First a modulo operation with the modulus M is conducted on brightness values of all pixels of the carrying image "Flower". The remainder obtained by the modulo operation is removed from the brightness value of the carrying image "Flower". Thus, brightness values of all pixels of the carrying image "Flower" have no remainders.

The brightness value of the payload image "Panda" is then divided from PB bit into PPB (per-pixel payload) bit per-pixel payloads, PB>PPB. The maximum value of PPB bit per-pixel payload must be smaller than the value of the modulus M. For example, the modulus M=8 is selected, and PB=CB=8. If PPB=3, 8 bit word or brightness value of payload covers 0-255 gray levels, and 3 bit per-pixel payload covers only 0-7 gray levels. When the divided per-pixel payload having 0-7 gray levels is superimposed on the carrying image having 0-255 gray levels, the human eye cannot detect the difference between the original image "Flower" and the image "Flower" embedded with the divided per-pixel payload image "Panda". A machine, i.e. a computer, also cannot detect whether the image "Flower" is embedded with a payload, for example, the payload image "Panda", because the machine does not know the original image "Flower".

To unpack the payload, a modulo operation with the same modulus M is again taken on the pixel brightness values of the carrying image "Flower". The remainders obtained from the modulo operation are per-pixel payloads. The per-pixel payloads are combined to the brightness value of each pixel of the payload image "Panda". Thus, the payload image "Panda" can be reconstructed.

The payload may be an image such as the payload image "Panda" in the example given. The payload may be a text message, or any file. Furthermore, the payload may be encrypted before it is embedded in the carrying image. For example, the encryption may be AES encryption or RSA encryption. If the encryption is applied, the image "Panda" may become the encrypted image "Panda", which may not be image "Panda" any more. The reconstructed encrypted payload is then decrypted to its original form, for example, the image "Panda". For example, the decryption may be of AES encryption or RSA encryption.

Figure 17:
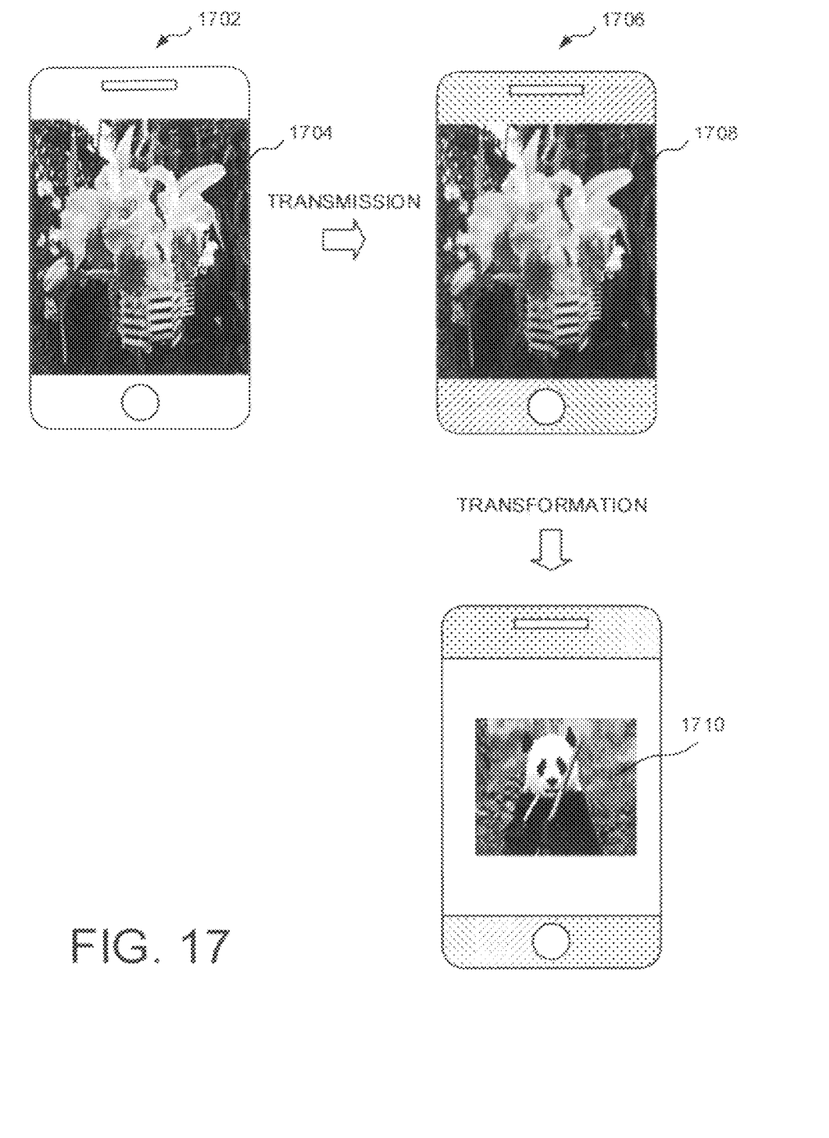
FIG. 17 shows an exemplary operation of payload-in-picture-encoding.

FIG. 17 shows an exemplary transmission operation, in accordance with an embodiment of the present invention. A first device 1702 transmits an image "Flower" 1704 to a second device 1706 in a lossless format. A received image "Flower" 1708 is displayed by second device 1706. When unpacking process is performed, image "Flower" 1708 displayed by second device 1706 is transformed into an image "Panda" 1710.

It is appreciated that the transmission in the exemplary operation depicted in FIG. 17 may be replaced by storage. An image "Flower" embedded with an image "Panda" is stored in a storage. Prior to unpacking process, the retrieved image "Flower" looks the same. When unpacking process is performed, the retrieved image "Flower" will be transformed into the image "Panda".

Figure 18:
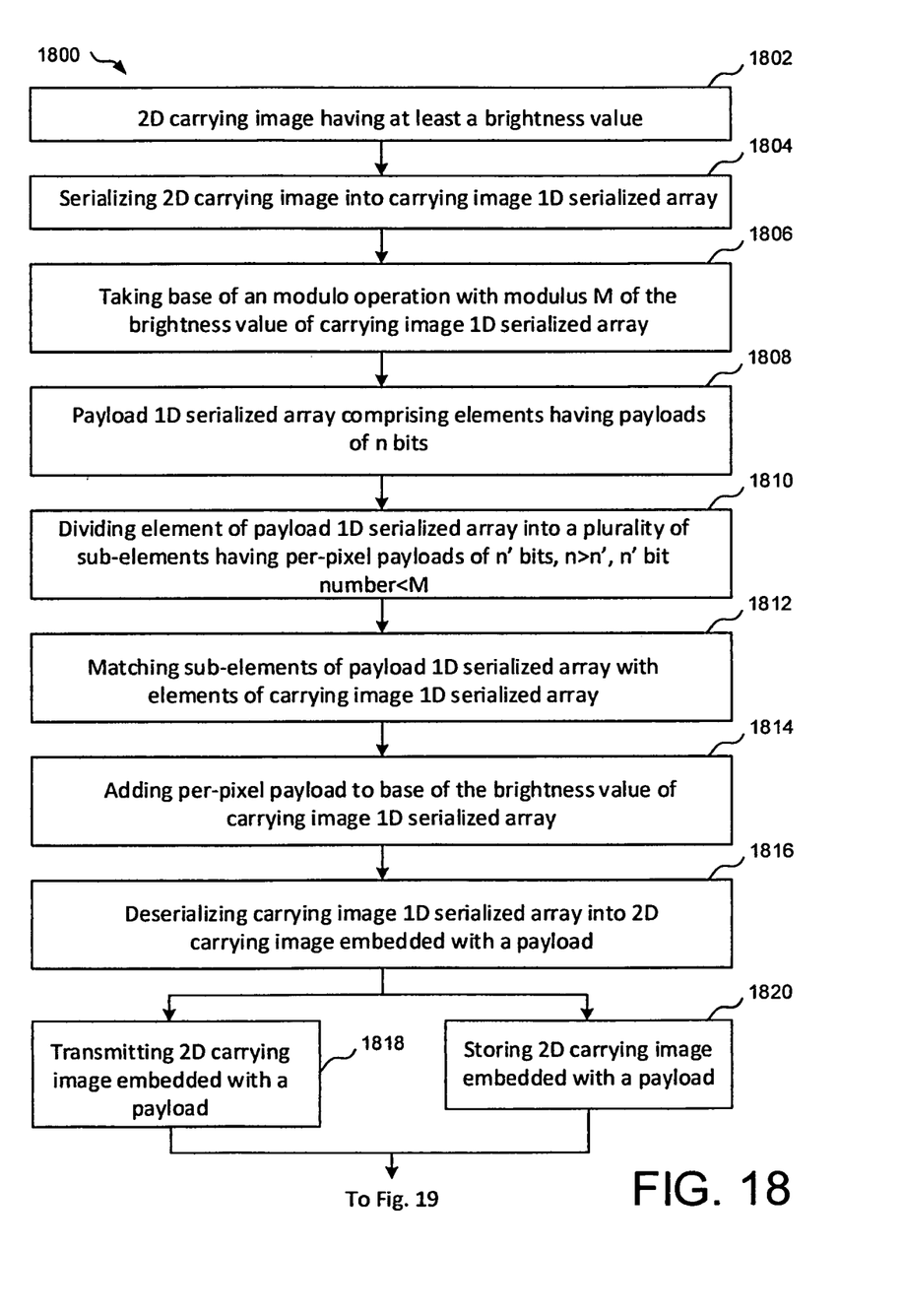
FIG. 18 shows an exemplary process to pack a payload into a 2D carrying image.

FIG. 18 shows an exemplary process 1800 to pack a payload into a carrying image, in accordance with an embodiment of the present invention. A 2D carrying image having at least a brightness value is provided in block 1802. The 2D carrying image is serialized into carrying image 1D serialized array in block 1804. The base of a modulo operation with a modulus M of the brightness value of the carrying image 1D serialized array is taken in block 1806. A payload 1D serialized array having payload of n bits is provided in block 1808. An element of payload 1D serialized array is divided into a plurality of sub-elements having per-pixel payload of n' bits in block 1810, where n is larger than n', and the maximum of n' bit number is less than the modulus M. Sub-elements of the payload 1D serialized array are matched with the elements of the carrying image 1D serialized array in block 1812. The per-pixel payload of sub-element of the payload 1D serialized array is added to the base of the element of the carrying image 1D serialized array in block 1814. The added carrying image 1D serialized array is deserialized into 2D carrying image embedded with a payload in block 1816. The 2D carrying image embedded with a payload may be transmitted in a lossless format in block 1818, or it may be stored in a lossless format in a storage in block 1820.

Figure 19:
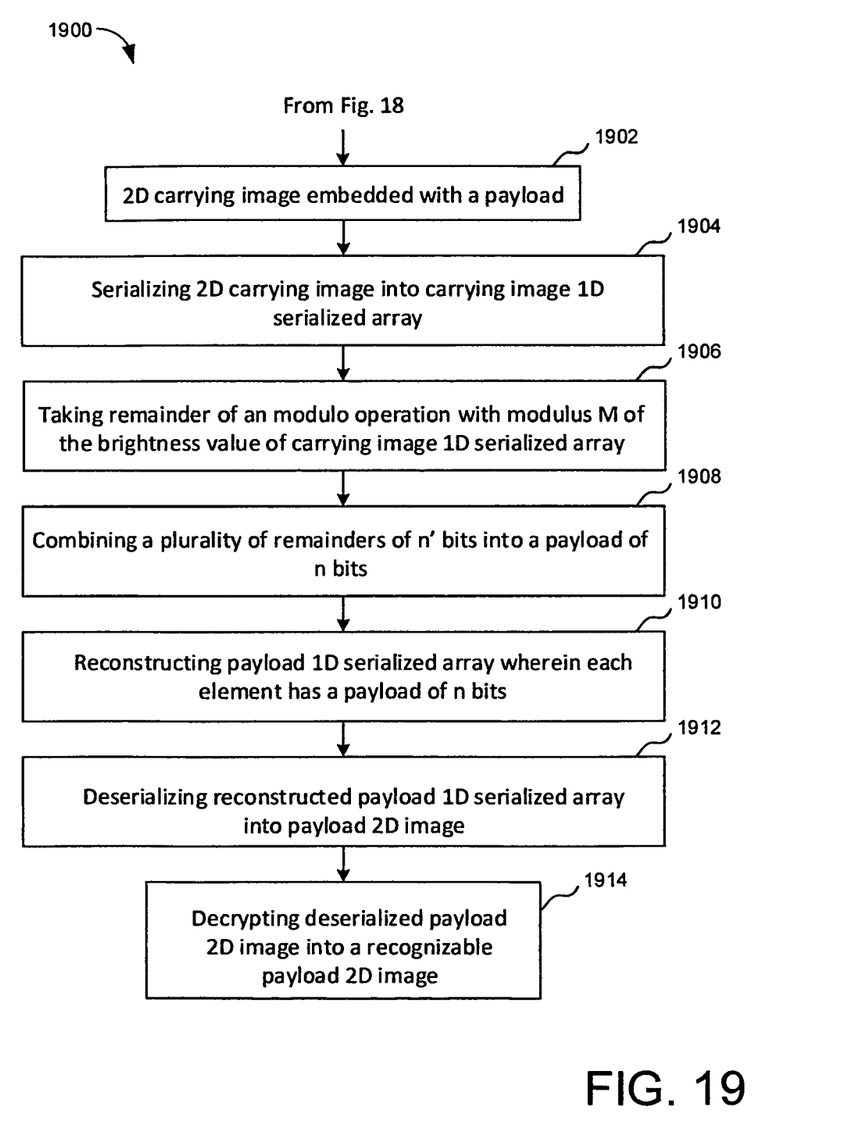
FIG. 19 shows an exemplary process to unpack a 2D carrying image embedded with a payload.

FIG. 19 shows an exemplary process 1900 to unpack the 2D carrying image embedded with a payload, in accordance with an embodiment of the present invention. The 2D carrying image embedded with a payload may be received through a transmission or retrieved from a storage in block 1902. The 2D carrying image embedded with a payload is serialized into the carrying image 1D serialized array in block 1904. The remainders of the modulo operation with the same modulus M of the brightness values of the carrying image 1D serialized array are taken in block 1906. A plurality of remainders, which are per-pixel payloads, having n' bits are combined to be a payload having n bits of an element of the payload 1D serialized array in block 1908. The payload 1D serialized array is reconstructed by combining sub-elements to an element, and combining per-pixel payloads to a payload in block 1910. Thus, each element of payload 1D serialized array has a payload of n bits. The reconstructed payload 1D serialized array is deserialized into a payload 2D image in block 1912. Optionally, if the payload 2D image is encrypted, the deserialized payload 2D image is decrypted into a human recognizable payload 2D image in block 1914.

The methods and processes of payload-in-picture-encoding described in the disclosure may be performed by a computer, a mobile phone, and other computing devices. The methods and processes of payload-in-picture-encoding comprise a process packing a payload into a carrying image and a reversed process unpacking the payload from the carrying image.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods and processes, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A process for embedding a payload in a carrying image, comprising:
   providing a 2D carrying image having a 2D array, wherein each element of the 2D array has at least a brightness value;
   serializing the 2D carrying image into a carrying image 1D serialized array, wherein each element of the carrying image 1D serialized array having at least a brightness value corresponds to an element of the 2D array;
   taking a base of an modulo operation with a modulus M of the brightness value of each element of the carrying image 1D serialized array;
   providing a payload 1D serialized array, wherein each element of the 1D serialized array has a payload having n bits;
   dividing each element of the payload 1D serialized array into a plurality of sub-elements, wherein the plurality of sub-elements have per-pixel payloads having n' bits, wherein n' is less than n, and wherein a maximum of n' bit number is less than the modulus M;
   matching each sub-element of the plurality of sub-elements with the element of carrying image 1D serialized array;
   adding the per-pixel payload of the sub-element of the plurality of sub-elements to the base of the carrying image 1D serialized array to embed the payload 1D serialized array to the carrying image 1D serialized array;
   deserializing the added carrying image 1D serialized array into a 2D carrying image embedded with the payload 1D serialized array.

2. The process of claim 1, further comprising:
   serializing the 2D carrying image embedded with the payload 1D serialized array into a 1D serialized array of carrying image embedded with the payload 1D serialized array having at least a brightness value;
   taking a remainder of an modulo operation with the modulus M of the brightness value of each element of the 1D serialized array of carrying image embedded with the payload 1D serialized array;
   combining the taken remainders having n' bits of a plurality of elements of the 1D serialized array of carrying image embedded with the payload 1D serialized array into a payload having n bits;
   reconstruct the payload 1D serialized array, wherein each element of the 1D serialized array has a payload having n bits.

3. The process of claim 2, wherein the payload 1D serialized array is from one of a 2D payload image, a text message, and a file.

4. The process of claim 2, wherein the payload 1D serialized array is from one of an encrypted 2D payload image, an encrypted text message, and an encrypted file.

5. The process of claim 4, wherein one of an AES encryption and RAS encryption is used to decrypt the one of an encrypted 2D payload image, an encrypted text message, and an encrypted file.

6. The process of claim 1, wherein the modulus M of the modulo operation is one of 2, 4, 8, and 16.

7. The process of claim 1, wherein the payload 1D serialized array is from one of a 2D payload image, a text message, and a file.

8. The process of claim 1, wherein the payload 1D serialized array is from one of an encrypted 2D payload image, an encrypted text message, and an encrypted file.

9. The process of claim 8, wherein one of an AES encryption and RAS encryption is used to encrypt the one of an encrypted 2D payload image, an encrypted text message, and an encrypted file.

10. The process of claim 1, wherein the at least brightness value is a monochrome brightness value.

11. The process of claim 1, wherein the brightness values comprises red (R), green (G), and blue (B) brightness values.

12. The process of claim 1, wherein the process is performed in one of a computer and a mobile phone.

13. A process for reconstructing a payload embedded in a carrying image, comprising:
   providing a 2D carrying image embedded with a payload having at least a brightness value;
   serializing the 2D carrying image embedded with a payload having at least a brightness value into a 1D serialized array of carrying image embedded with a payload having at least a brightness value;
   taking a remainder of an modulo operation with a modulus M of the brightness value of each element of the 1D serialized array of carrying image embedded with a payload;
   combining the taken remainders having n' bits of a plurality of elements of the 1D serialized array of carrying image embedded with a payload into a payload having n bits, where n' is less than n, and wherein a maximum of n' bit number is less than the modulus M;
   reconstructing the payload 1D serialized array, wherein each element of the 1D serialized array has a payload having n bits.

14. The process of claim 13, wherein the payload 1D serialized array is from one of a 2D payload image, a text message, and a file.

15. The process of claim 13, wherein the payload 1D serialized array is from one of an encrypted 2D payload image, an encrypted text message, and an encrypted file.

16. The process of claim 15, wherein one of an AES encryption and RAS encryption is used to decrypt the one of an encrypted 2D payload image, an encrypted text message, and an encrypted file.

17. The process of claim 13, wherein providing a 2D carrying image embedded with a payload having at least a brightness value is one of receiving from a transmission and retrieving from a storage.

18. A process for transmitting a payload embedded in a picture using payload-in-picture-encoding, comprising:
- transmitting a human recognizable picture by a first device;
- receiving the transmitted human recognizable picture by a second device;
- processing the received human recognizable picture;
- transforming the received human recognizable picture into a payload;
- taking remainders of an modulo operation with a modulus M of brightness values of pixels of the received recognizable picture;
- combining the taken remainders having n' bits of a plurality of pixels of the received human recognizable picture into a payload having n bits, wherein n is larger than n', and wherein a maximum of n' bit number is less than the modulus M;
- reconstructing the transformed payload comprising the payload having n bits combined from the taken remainders having n' bits.

19. The process of claim 18, wherein the payload is one of a 2D payload image, a text message, a file, an encrypted 2D payload image, an encrypted text message, and an encrypted file.

\* \* \* \* \*